United States Patent [19]
Cecinas

[11] Patent Number: 5,722,617
[45] Date of Patent: Mar. 3, 1998

[54] ADJUSTABLE SAFETY SEAT FOR A VEHICLE SUCH AS AN AIRCRAFT

[75] Inventor: Laurent Cecinas, Rochefort, France

[73] Assignee: Societe Nationale Industrielle et Aerospatiale, Paris, France

[21] Appl. No.: 659,195

[22] Filed: Jun. 6, 1996

[30] Foreign Application Priority Data

Jun. 9, 1995 [FR] France .................. 95 06837

[51] Int. Cl.$^6$ .................. B64D 25/04
[52] U.S. Cl. .................. 244/122 R; 296/68.1; 296/65.1; 297/326
[58] Field of Search .................. 244/122 R; 248/371, 248/398, 278.1, 429; 403/53, 322, 325; 296/68.1, 65.1; 188/38, 41, 43, 371; 297/216.19, 258.1, 270.1, 314, 326, 344.1

[56] References Cited

U.S. PATENT DOCUMENTS

| | | | |
|---|---|---|---|
| 1,362,041 | 12/1920 | Roe | 296/65.1 |
| 2,587,679 | 3/1952 | Atkinson | 296/65.1 |
| 3,489,250 | 1/1970 | Kuhlmann | 188/43 |
| 3,741,511 | 6/1973 | Streeter | |
| 4,095,770 | 6/1978 | Long | 297/314 |
| 4,408,744 | 10/1983 | Thompson | |
| 4,846,529 | 7/1989 | Tulley | |
| 5,054,739 | 10/1991 | Wallin | 248/371 |

FOREIGN PATENT DOCUMENTS

| | | | |
|---|---|---|---|
| 0 054 880 | 6/1982 | European Pat. Off. | |
| 379137 | 10/1907 | France | 297/314 |
| 2 450 172 | 9/1980 | France | |
| 35 40 486 | 5/1987 | Germany | |
| 5085243 | 6/1993 | Japan | |
| 2 009 881 | 6/1979 | United Kingdom | |

Primary Examiner—Andres Kashnikow
Assistant Examiner—Tien Dinh
Attorney, Agent, or Firm—Burns, Doane, Swecker & Mathis, LLP

[57] ABSTRACT

An adjustable seat of a vehicle such as an aircraft, comprises a fixed baseplate, the top plate of which is mounted on two lower components by two hinged joints. These hinged joints define two pins oriented parallel to the plane of the top plate, in the vehicle's transverse and longitudinal directions respectively. Moreover, one of these hinged joints is placed at the apex of a triangle, the opposite side of which is coincident with the pin of the other hinged joint. The integrity of the bed of the seat is thereby preserved in the event of twisting of the floor.

11 Claims, 2 Drawing Sheets

ADJUSTABLE SAFETY SEAT FOR A VEHICLE SUCH AS AN AIRCRAFT

DESCRIPTION

1. Technological Field

The invention relates to an adjustable seat designed for fitting to a vehicle such as an aircraft, a motor caravan or similar vehicle.

More precisely, the invention relates to an adjustable seat particularly suitable for use in a business aeroplane without the adjustable nature of the seat affecting the safety of the passengers.

2. State of the Art

It has become more and more common to equip certain vehicles, such as business aeroplanes with armchairs designed to be adjustable, at will, from front to back, laterally and rotatably.

To control the movements of the armchair, the passenger has available a control such as an arm or a lever, which upon actuation frees releasable locking means, by which the bed of the armchair is normally immobilised on a baseplate fixed to the floor of the aeroplane or onto rails mounted on that floor.

According to a first known technique, the releasable locking means include a mechanism which allows two translations, respectively in a longitudinal direction and in a transverse direction with respect to the aeroplane and a rotation about an axis perpendicular to the plane defined by the two preceding directions. This axis of rotation is usually vertical when the aeroplane is on the ground.

When the adjustment control is not actuated, locking members, for example, in the form of cleats, are kept resiliently engaged on two racks laid in the two directions of translation movement and on a toothed wheel centred on the pivoting axis. When it is actuated, the adjustment control acts simultaneously on these three locking members via a system of cables so that they are cleared from the racks and the toothed wheel. It is then possible for the passenger to move his/her armchair, as he/she wishes, with respect to the fixed baseplate, within the limits of the travel available. It should be noted that the cleats-racks-toothed wheel assembly is sometimes replaced by equivalent mechanisms of the pin and hole or friction type.

Another known technique, disclosed, for example, in documents U.S. Pat. No. 4,588,226, U.S. Pat. No. 4,671,572 and U.S. Pat. No. 4,756,502 consists of fitting the bed of the armchair with a barrel directed downwards and passing through openings formed in the top plate of the baseplate which supports it and in an intermediate plate located under the baseplate. A pillar slidably assembled in the barrel carries, on its bottom end, a brake plate positioned below the intermediate plate. Resilient means normally act on the pillar in an upward direction so that the brake plate is held in frictional contact with the intermediate plate which is itself in frictional contact with the lower surface of the top plate of the baseplate.

When the adjustment control is actuated by the passenger, the pillar is displaced downwards in the barrel by a cam system driven by a cable in such a way that the frictional contact between the brake plate and the top plate of the baseplate is interrupted. Movement of the armchair in any horizontal direction or in rotation then becomes possible, within the limits of the travel defined by the openings formed in the top plate of the baseplate and in the intermediate plate. Usually the opening formed in the baseplate is of square or rectangular shape.

In a variant of this second technique, illustrated by document U.S. Pat. No. 4,625,934, the barrel is replaced by a pillar, on which two clutch plates positioned on both sides of the top plate of the baseplate slide directly, with rotation being prevented. Springs normally keep the clutch plates engaged against the plate. Actuation of the adjustment control causes the clutch plates to move apart and, consequently, allows adjustment of the seat.

These two known techniques allow the position and the orientation of an aeroplane armchair to be changed in a horizontal plane, within limits fixed by the constructor. However, they both have deficiencies with regard to safety.

Hence, if an accident causes twisting of the floor, there is a risk that this twisting will be passed on, in its entirety to the baseplate of the seat, which can be translated into deformation or indeed release of the bed of the seat, which it is supporting, when position and orientation adjustments to the armchair are secured by releasing a brake plate. Furthermore, in this latter case, a violent impact may cause uncontrolled movement of the bed relative to the fixed baseplate which can be very dangerous for the occupant of the seat.

DISCLOSURE OF THE INVENTION

The main object of the invention is an adjustable seat for a vehicle such as an aircraft, or other vehicle, the design of which allows that twisting of a lower floor to certain limits (for example, plus or minus 10° in two directions at right angles) avoids causing deformation of the baseplate and, as a consequence, a risk of deformation or release of the bed of the seat whatever the releasable locking means which allow the seat to be adjusted.

In accordance with the invention, this object is achieved by means of an adjustable seat for a vehicle including:

- a baseplate provided with a top plate and at least one lower component carrying the top plate and intended to be fixed to a vehicle support structure;
- at least one bed resting on the top plate of the baseplate; and
- releasable locking means by which the bed is normally immobilised on the baseplate and the actuation of which allows displacements of the bed parallel to the top plate;

characterised in that the baseplate includes at least two lower components attached to the top plate by hinged joint means defining two hinge pins approximately at right angles to each other oriented parallel to the top plate, a first of these hinged joint means, which defines a first hinge pin being positioned substantially at the apex of a triangle the opposite side of which is coincident with the second hinge pin.

In a preferred embodiment of the invention, the first hinge pin is oriented in a substantially transverse direction with respect to the vehicle and the second hinge pin is oriented in a substantially longitudinal direction with respect to the vehicle.

When the support structure of the vehicle includes two parallel fitting rails, each of the hinged joint means is advantageously positioned close to one of these rails.

In this case, when the top plate has two straight lateral edges, oriented in said substantially longitudinal direction, a first edge is attached to a first lower component by the first hinged joint means, and the second edge of the top plate is attached to the second lower component by the second hinged joint means.

More precisely, the first straight lateral edge of the top plate then has, preferably, a longitudinal flange projecting downward, by which this first straight edge is attached to the first lower component through the first hinged joint means. In this case, the first lower component is positioned below the longitudinal flange and defines with the latter a gap which allows predetermined pivoting of the top plate about the first hinge pin.

Furthermore, the second lower component has, preferably, has a straight top edge, oriented in a substantially longitudinal direction and attached to the second lateral straight edge of the top plate by the second means of articulation.

In the preferred embodiment of the invention, the releasable locking means are simplified and include:

a barrel integral with the bed and projecting down through an opening formed in the top plate;

a pillar slidably mounted in the barrel a single brake plate integral with a lower end of the pillar, below the top plate;

resilient means placed between the barrel and the pillar, in such a way that the brake plate is pressed directly against the lower face of the top plate; and cam control means, the actuation of which moves the pillar downwards within the barrel, in opposition to the resilient means.

The risks of uncontrolled movement of the bed of the seat in the event of an impact are avoided by the fact that the opening formed in the top plate has a main adjusting part, extended laterally along a rear edge by an appendage having a front edge oriented in a substantially transverse direction with respect to the vehicle. Locating the barrel in this appendage during periods of risk for the aircraft, such as take-off and landing, ensures support in a forward direction which prevents uncontrolled movements of the bed of the seat.

Preferably, the front edge of the appendage has a zone of least resistance which allows the barrel to be embedded in the front edge, in the event of impact of the vehicle against an obstacle.

In the preferred embodiment of the invention, the zone of least resistance includes a partition separating the front edge of the appendage from an aperture passing through the top plate, at the front of this appendage.

As has already been mentioned, the seat according to the invention is particularly suited to be used on an aircraft, even though other applications are possible.

BRIEF DESCRIPTION OF THE DRAWINGS

A preferred embodiment of the invention will now be described, as a non-limiting example, while referring to the appended drawings, in which.

DETAILED DESCRIPTION OF ONE EMBODIMENT

Figure 1:
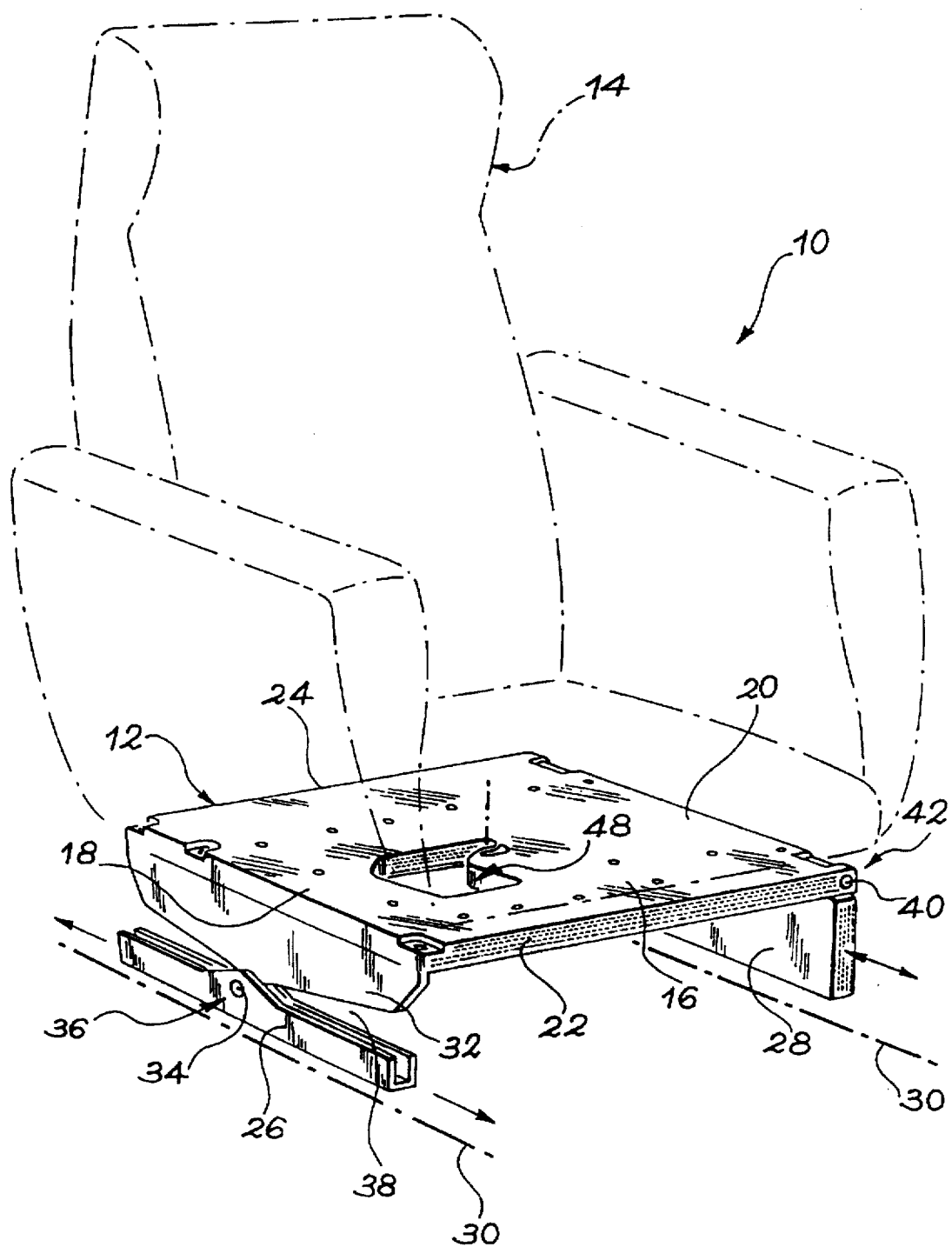
FIG. 1 is a perspective view which shows, in solid line, the baseplate of an adjustable armchair in accordance with the invention, the bed of which is shown schematically with broken lines.

In FIG. 1, reference number 10 designates, in a general way, an armchair for fitting to a vehicle such as a business aeroplane.

Figure 2:
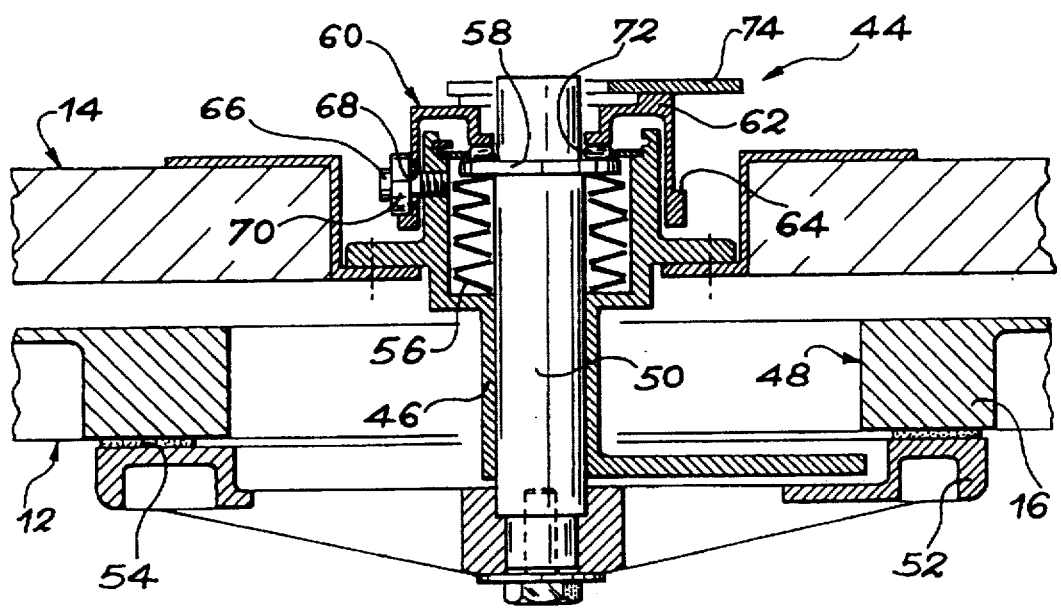
FIG. 2 is a vertical section view which shows in more detail the releasable locking means fitted to the adjustable armchair of FIG. 1.

This armchair 10 includes a fixed baseplate 12 and a bed 14 of which only the central lower part, without its covering, appears in FIG. 2. The term "bed" throughout the description refers to the part of the armchair 10 provided to receive the passenger, the position and orientation of which can be adjusted with respect to the baseplate. It should be noted that although FIG. 1 shows a seat 10 including a baseplate 12 which supports a single bed 14, the invention is equally applicable to the case of a seat the baseplate of which supports simultaneously several beds positioned side by side.

As is shown more clearly in FIG. 1, baseplate 12 of the armchair 10 includes a top plate 16, of rectangular shape, which is intended to be positioned in a substantially horizontal plane when the aeroplane is on the ground. The top plate 16 has two straight lateral edges made up of a right edge 18 and a left edge 20. It also has a front edge 22 and a rear edge 24. When the baseplate 12 is fitted on the aeroplane, the straight lateral edges 18 and 20 are oriented in a substantially longitudinal direction with respect to the aeroplane and the front 22 and rear 24 edges are oriented in a substantially transverse direction with respect to the aeroplane.

Furthermore, baseplate 12 of armchair 10 has a first lower component 26, situated below the right edge 18 of the top plate 16 and a second lower component 28, situated below the left edge 20 of plate 16.

The lower components 26 and 28 are intended to be fixed to a support structure which may be provided either directly by the floor of the aeroplane, or by rails 30 fixed to the floor, as is shown schematically in broken lines on FIG. 1. The fixing of lower components 26 and 28 of baseplate 12 to the floor or to the rails 30 is achieved by any technique such as bolting which is well known to those skilled in the art and does not form part of the invention.

The first lower component 26 of baseplate 12 has, for example, a U-shaped section which extends in a substantially longitudinal direction with respect to the aeroplane, over a length close to the length of the top plate 16 in this same direction. Furthermore, the right edge 18 of top plate 16 has a longitudinal flange 32 projecting downwards in the direction of first component 26 and the lower edge of which has roughly a flared V-shape, in the longitudinal direction previously mentioned. This arrangement allows the lower part of the longitudinal flange 32 to be attached to the first lower component 26 by a fulcrum pin 34. This fulcrum pin 34 is oriented in a substantially transverse direction with respect to the aeroplane and is situated preferably, substantially at the centre of the first lower component 26. Pin 34 thus forms a first hinged joint means 36 between top plate 16 and the first lower component 26.

Because of the flared V shape of the lower edge of longitudinal flange 32 and the substantially straight shape of the top edge of lower component 26, a gap 38 is defined between longitudinal flange 32 and component 26. This gap 38 allows a predetermined pivoting (for example of at least ±10°) of top plate 16 around the hinge pin 34.

The second lower component 28 has the shape of a flat rectangular plate which extends in an approximately longitudinal direction with respect to the aeroplane, approximately over the entire length of the top plate 16 in this direction. Furthermore, it is arranged substantially vertically between the rail 30 which corresponds to it and the left edge 20 of the top plate 16. More precisely, the second lower component 28 has a lower straight edge by which it is fixed onto the corresponding rail 30 and a straight upper edge which is attached to the left edge 20 of the top plate by a hinge pin 40. This hinge pin 40 is oriented in a substantially longitudinal direction with respect to the aeroplane and extends over substantially the entire length of plate 16 in this direction. The hinge pin 40 defines a second hinged joint means 42 linking the second lower component 28 to the top plate 16.

It should be noted that instead of being situated at the level of top plate 16, the hinge pin 40 may be positioned at any level between this plate 16 and the corresponding rail 30 without departing from the scope of the invention.

It arises from the preceding description that the top plate 16 which supports bed 14 of armchair 10 is mounted on components 26 and 28 by two pins 34 and 40 at right angles to each other and oriented parallel to the top plate 16. Furthermore, the hinged joint means 36 by which the top plate 16 is mounted on the first lower component 26 is positioned substantially at the apex of a triangle, such as an isosceles triangle whose opposite side is coincident with hinge pin 40 of the second hinged joint means 42. Furthermore, hinged joint means 36 and 42 are situated close to each of the rails 30.

Thanks to this arrangement, if the floor of the aeroplane is subjected to twisting during an accident, top plate 16 is not subjected, in practice, to any deformation at all insofar as the twisting does not exceed angles of plus or minus 10° in the two directions defined by the hinge pins 34 and 40. This absence of deformation of top plate 16 of the baseplate, which supports bed 14 of the seat, allows deformation or detachment of this bed to be avoided during an accident.

The releasable locking means by which bed 14 of the seat is mounted on top plate 16 of baseplate 12 will now be described with reference to FIGS. 2 and 3.

These releasable locking means, designated in a general way by reference number 44 on FIG. 2, include a barrel 46 fixed to the centre of the bottom part of bed 14 and which projects downwards through an opening 48 formed in the top plate 16 of baseplate 12. The axis of the barrel 46 is oriented perpendicular to the plane of top plate 16, i.e. in a vertical direction.

The releasable locking means 44 further comprise a pillar 50 which is mounted inside barrel 46 in such a way that it can slide axially therein. At its bottom end, this pillar 50 projects beyond barrel 46 and carries a brake plate 52, for example in the shape of a dome. This brake plate 52 is positioned below top plate 16 of baseplate 12 and its dimensions are greater than those of the opening 48. The plate 52 is advantageously provided, on its upper plane surface, with a friction pad 54 adapted to directly engage, by friction, the lower flat face of top plate 16 of baseplate 12.

The brake plate 52 carrying the friction pad 54 is usually pressed against the lower face of top plate 16 by resilient means, made up of, for example a stack of elastic rings 56, as shown in FIG. 2.

More precisely, the stack of elastic rings 56 is positioned on pillar 50 in the upper part of greater diameter of barrel 46, situated at the level of the bottom part of bed 14. The bottom end of the stack of elastic rings 56 is pressed against a shoulder formed in the barrel 46, while the top end of this stack is pressed against a flange 58 formed in the top of the pillar 50. In this way, a prestress is permanently being applied on pillar 50, which tends to displace it upwards, i.e. to press the brake plate 52 against top plate 16. This prestress is sufficiently high to ensure that the bed 14 is normally effectively immobilised.

In order to allow a passenger to adjust the position and the orientation of the bed 14 with respect to baseplate 12, the releasable locking means 44 further comprise cam control means designated in a general way by reference number 60 on FIG. 2.

These control means 60 include a rotatable collar 62, an internal part of which rests on the flange 58 of pillar 50 through a thrust ball or roller bearing 72. The collar 62 overlaps the top end of barrel 46 and, on the outside of the barrel, is continued downwards by a tubular section. The bottom end of this tubular section is fitted on its external surface with a shoulder turned upwards, forming a cam surface 64.

In the top of its upper section, located inside the external tubular section of collar 62, the barrel 46 carries a screw 66, oriented radially towards the outside. This screw 66 passes through a slot 68 formed in the external tubular section of the collar 62. The slot 68 extends circumferentially around the external tubular section of the collar 62, in a way that allows rotation of the collar 62 about its vertical axis over a predetermined angle. On the outside of the external tubular section of the collar 62, the screw 66 carries a follower 70 located opposite the cam surface 64.

In the normal locked position of the releasable locking means 44, the follower 70 is located above the lowest part of the cam surface 64.

The stack of elastic rings 56 keeps the collar 62 in a position such that a limited vertical gap exists between the follower 70 and the cam surface 64. This position is determined by the brake plate 52 coming to press against top plate 16.

A horizontal lever 74, rigidly fixed to collar 62, is connected by a cable (not shown) to an unlocking control mechanism (not shown). When the person occupying the armchair actuates this control mechanism, this causes rotation of the collar 62 through the cable and lever 74. Rotation of collar 62 results in causing the cam surface 64 to be moved by the follower 70. The result is that the collar 62 is moved downwards, with respect to the barrel 46 and the seat bed 14. This displacement of the collar 62 has the effect of pushing pillar 50 and the brake plate 52 it carries, downwards through the thrust ball bearings 72. This movement, which takes place in opposition to the action of the stack of elastic rings 56, is sufficient to disengage the friction pad 54, supported by brake plate 52 from the lower face of top plate 16. As a consequence, the person occupying the seat can move and position it freely within the limits fixed by opening 48 formed in the top plate 16 of baseplate 12.

Figure 3:
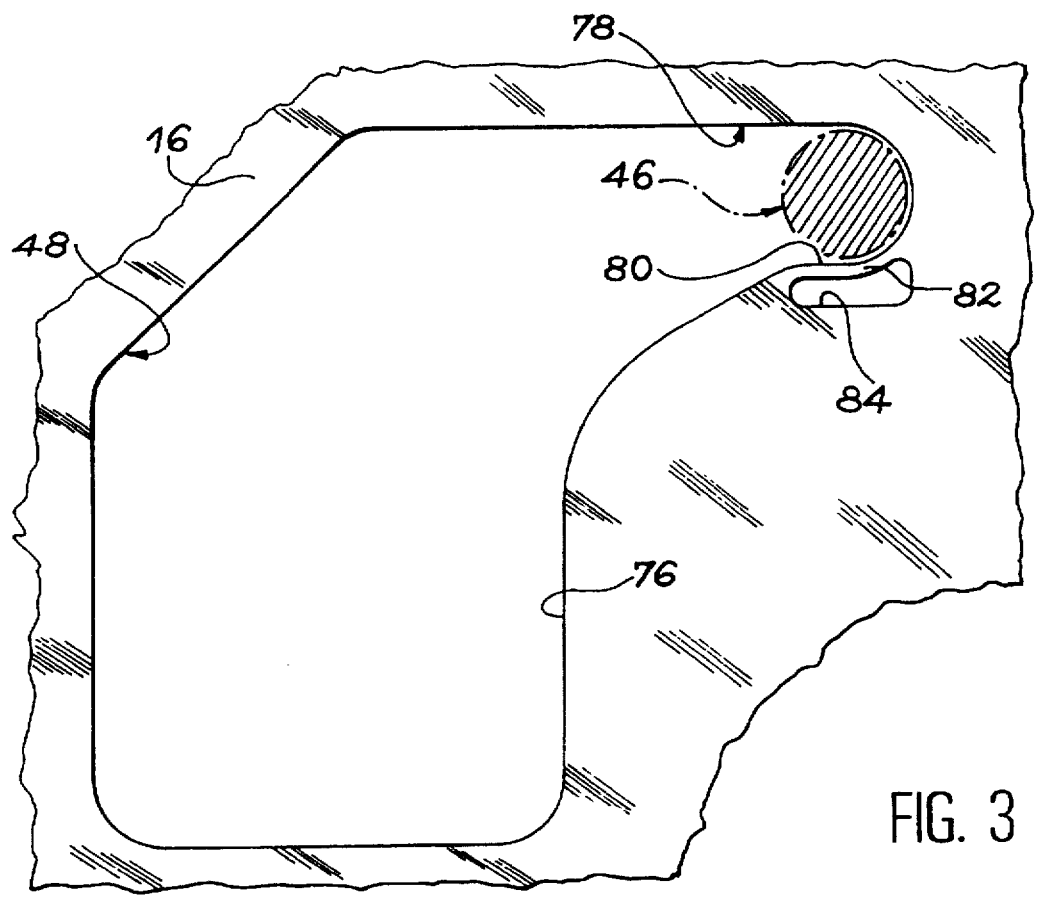
FIG. 3 is a top view showing, on a larger scale, the part of the top plate of the armchair baseplate, in which the opening associated with the releasable locking means shown in FIG. 2, is made.

According to a particularly advantageous layout illustrated in FIG. 3, the opening 48 formed in the top plate 16 comprises, in addition to a main adjustment part 76 of approximately square or rectangular shape, an appendage 78 which laterally extends the main adjustment part 76 along this back edge. In its end part, this appendage has a front edge 80 oriented in a substantially transverse direction with respect to the aeroplane. The back edge of opening 48, common to the main adjustment part 76 and the appendage 78, is oriented in the same direction, at least in that part of it forming appendage 78. Furthermore, the distance between the front edge 80 of the appendage 78 and the part of the back edge of opening 48 parallel to this front edge is substantially equal, within the operational setting, to the external diameter of the barrel 46 at the level of top plate 16.

Consequently, when the barrel 46 is received in the semi-circular bottom of appendage 78, as shown in broken lines in FIG. 3, it defines a stable location for bed 14 of the seat. This location enables preventing any relative movement of the bed forward or backward, with respect to baseplate 12 of the seat, even in the event of an impact sufficiently great to risk breaking the friction contact between brake plate 52 and top plate 16.

As illustrated in FIG. 3, this device is advantageously complemented by providing, on the front edge 80 of appendage 78, a zone 82 of least resistance which allows a limited embedding of the barrel into this front edge, in the event of impact of the aeroplane against an obstacle.

In the embodiment shown, this zone of least resistance is formed by a partition 82 of limited thickness separating the front edge 80 of appendage 78 from an aperture 84 through top plate 16 at the front of appendage 78.

When the pillar 46 is located in the bottom of appendage 78, as shown in broken line in FIG. 3, the axis of this pillar is practically at the centre of top plate 16 of the baseplate 12. It is imperative that the bed 14 of the seat must be located in this position in periods of maximum risk, i.e. particularly at takeoff and landing of the aeroplane. Under these conditions, if a frontal impact occurs, the inertial forces applied to the bed 14 of the seat tend to move it violently forward, which leads to rupture of the partition 82 and to the barrel 46 being embedded in the housing then formed in the front edge of appendage 78 by the aperture 84. This ensures that the bed of the seat is maintained in position.

It should be noted that both the structure of baseplate 12, described mainly with reference to FIG. 1, and the configuration of opening 48, which has just been described mainly with reference to FIG. 3, contribute to preserving the integrity of the seat and its occupant in the event of a violent impact which could lead to a twisting of the floor.

It is understood that when the releasable locking means by which the bed of the seat is assembled on its baseplate are different to those which have been described with reference particularly to FIG. 2, a baseplate designed in the manner which has been described with reference to FIG. 1 can be used, without the arrangements described in other respects with reference to FIG. 3 being necessary.

I claim:

1. An adjustable seat for a vehicle comprising:

a baseplate provided with a top plate and at least one lower component carrying the top plate and intended to be fixed to a support structure of the vehicle;

at least one seat bed resting on the top plate of the baseplate; and releasable locking means by which the seat bed is normally immobilised on the baseplate and an actuation of which allows movements of the seat bed parallel to the top plate;

in which the baseplate includes at least two lower components respectively attached to the top plate by hinged joint means defining two hinge pins substantially at right angles to each other, oriented parallel to the top plate, a first of these hinged joint means, which defines a first of the hinge pins being positioned substantially at the apex of a triangle, the opposite side of which is coincident with the second hinge pin.

2. A seat according to claim 1, in which the first hinge pin is oriented in a substantially transverse direction with respect to the vehicle and the second hinge pin is oriented in a substantially longitudinal direction with respect to the vehicle.

3. A seat according to claim 2, in which the top plate, having two straight lateral edges, oriented in said substantially longitudinal direction, a first of these edges is attached to a first of the lower components by the first hinged joint means and the second edge of the top plate is attached to the second lower component by the second hinged joint means.

4. A seat according to claim 3, in which the first straight lateral edge of the top plate has a longitudinal flange projecting downwards, by which this first straight edge is attached to the first lower component through the first hinged joint means, the first lower component being positioned below the longitudinal flange defining with the latter a gap which allows a predetermined degree of pivoting of the top plate around the first hinge pin.

5. A seat according to claim 3, in which the second lower component has a straight upper edge, oriented in said substantially longitudinal direction and attached to the second straight lateral edge of the top plate by the second hinged joint means.

6. A seat according to claim 1, in which the support structure comprises two parallel rails, each of the hinged joint means is positioned close to one of these rails.

7. A seat according to claim 1, in which the releasable locking means include:

a barrel rigidly fixed to the seat bed and projecting downwards through an opening formed in the top plate;

a pillar slidably mounted within the barrel;

a single brake plate integral with the bottom end of the pillar, below the top plate;

resilient means positioned between the barrel and the pillar in such a way that the brake plate is pressed directly against the lower face of the top plate; and cam control means, an actuation of which displaces the pillar downwards in the barrel, in opposition to the resilient means.

8. A seat according to claim 7, in which the opening formed in the top plate has a main adjustment part, extended laterally, along a back edge by an appendage having a front edge oriented in a substantially transverse direction with respect to the vehicle.

9. A seat according to claim 8, in which the front edge of the appendage has a zone of least resistance which allows embedding of the barrel in the front edge in the event of impact of the vehicle against an obstacle.

10. A seat according to claim 9, in which the zone of least resistance includes a partition separating the front edge of the appendage from an aperture through the top plate at the front of the appendage.

11. A seat according to claim 1, in which the vehicle is an aircraft.

* * * * *